(12) United States Patent
Ghosal et al.

(10) Patent No.: US 10,838,832 B2
(45) Date of Patent: Nov. 17, 2020

(54) CLUSTER FAILOVER TO AVOID NETWORK PARTITIONING

(71) Applicant: Ruckus Wireless, Inc., Sunnyvale, CA (US)

(72) Inventors: Sudip Ghosal, Saratoga, CA (US); Yi-Nan Lee, Milpitas, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 148 days.

(21) Appl. No.: 16/046,109

(22) Filed: Jul. 26, 2018

(65) Prior Publication Data
US 2019/0036765 A1 Jan. 31, 2019

Related U.S. Application Data

(60) Provisional application No. 62/536,988, filed on Jul. 26, 2017.

(51) Int. Cl.
*G06F 11/00* (2006.01)
*G06F 11/20* (2006.01)
*H04L 12/24* (2006.01)

(52) U.S. Cl.
CPC ...... *G06F 11/2023* (2013.01); *H04L 41/0686* (2013.01); *H04L 41/0856* (2013.01); *G06F 2201/805* (2013.01); *G06F 2201/82* (2013.01)

(58) Field of Classification Search
CPC . H04L 41/08; H04L 41/0803; H04L 41/0813; H04L 41/085; H04L 41/0856; G06F 11/1658; G06F 11/20; G06F 11/202–2048; G06F 11/2097; H04W 24/04; H04W 84/12
See application file for complete search history.

(56) References Cited

U.S. PATENT DOCUMENTS

| 9,973,987 B2* | 5/2018 | Yang | H04W 84/12 |
| 2006/0015773 A1* | 1/2006 | Singh | G06F 11/2028 714/13 |
| 2011/0178983 A1* | 7/2011 | Bernhard | G06F 11/08 707/610 |
| 2014/0236891 A1* | 8/2014 | Talius | G06F 11/00 707/613 |

(Continued)

*Primary Examiner* — Michael Maskulinski
(74) *Attorney, Agent, or Firm* — Steven Stupp; Stewart Wiener

(57) ABSTRACT

During a synchronization technique, states of a primary cluster in the computer system with multiple primary controllers that provide controllers for access points and a backup cluster in the computer system with multiple backup controllers that independently provide controllers for the access points may be dynamically synchronized. In particular the primary cluster may receive configuration requests with configuration information for the access points on an input node of the primary cluster. In response, the primary cluster may store the configuration requests in a replay queue in the computer system. Then, the primary cluster may playback the configuration requests in the replay queue for the backup cluster to synchronize the states of the primary cluster and the backup cluster. For example, the configuration requests may be played back within a time interval associated with a service level agreement of a service provider of a service for the access points.

20 Claims, 5 Drawing Sheets

(56) References Cited

U.S. PATENT DOCUMENTS

| | | | | |
|---|---|---|---|---|
| 2015/0036488 A1* | 2/2015 | Mettu | ..................... | H04L 67/34 370/230 |
| 2016/0085606 A1* | 3/2016 | Panasko | .............. | G06F 11/2028 714/37 |
| 2018/0329789 A1* | 11/2018 | Shang | ................. | G06F 11/2023 |

* cited by examiner

CLUSTER FAILOVER TO AVOID NETWORK PARTITIONING

CROSS-REFERENCE TO RELATED APPLICATION

This application claims the benefit of U.S. Provisional Patent Application No. 62/536,988, filed Jul. 26, 2017.

BACKGROUND

Field

The described embodiments relate to techniques for synchronizing the states of a primary controller and a backup controller for access points in a zone.

Related Art

Cloud-based computer systems allow central resources to be accessed from multiple remote locations via a network, such as the Internet. For example, a controller for multiple access points may be remotely implemented using a cloud-based computer system.

Because the service agreements with customers often stipulate that the controller provide reliable support for the access points, the cloud-based computer system may include a backup controller. In principle, this redundancy can ensure that support is available for the access points even if the controller fails or is unavailable.

In practice, it can be difficult to provide remote reliable redundant support for the access points. In particular, the configuration of the access points is often dynamic. For example, the controller may process numerous customer requests to modify the configuration of the access points, and thus the state of the controller. However, because of failures in the computer system, it can be difficult to ensure that the state of the backup controller reflects these dynamic changes, i.e., is synchronized with the state of the controller.

SUMMARY

The described embodiments relate to a computer system that synchronizing states of a primary cluster with multiple primary controllers and a backup cluster with multiple backup controllers. This computer system includes: the primary cluster with the primary controllers and a replay queue; and the backup cluster with the backup controllers. Moreover, the primary controllers and the backup controllers may independently implement controllers for access points. Furthermore, the primary cluster may: receive configuration requests with configuration information for the access points on an input node of the primary cluster; store the configuration requests in the replay queue; and playback the configuration requests in the replay queue for the backup cluster to synchronize the states of the primary cluster and the backup cluster.

Note that the access points may be divided into zones and a given zone may be associated with a given primary controller and a given backup controller. For example, the zones may be based on: geographic locations of the access points, and/or software versions of the access points. In some embodiments, the computer system may provide network addresses of the given primary controller and the given backup controller to an output node of the computer system for a subset of the access points in the given zone.

Moreover, when the given primary controller fails, the primary cluster may: receive requests associated with the subset of the access points in the given zone on the input node of the primary cluster; and provide, using at least another primary controller, failover coverage for the subset of the access points. Note that the requests may be independently received from the subset of the access points. In some embodiments, the primary cluster may select the other primary controller based on loading of the primary controllers.

Furthermore, when the other primary controller subsequently fails, the backup cluster may: receive additional requests associated with the subset of the access points on an input node of the backup cluster; and provide, using at least the given backup controller, failover coverage for the subset of the access points in response to the additional requests. Note that the additional requests may be independently received from the subset of the access points.

Additionally, when a link between the primary cluster and the backup cluster fails, the primary cluster may: store additional configuration requests that are subsequently received in the replay queue; and playback the additional configuration requests in the replay queue for the backup cluster when the link is restored.

In some embodiments, the configuration requests are played back within a time interval. For example, the time interval may be associated with a service level agreement of a service provider of a service for the access points.

Another embodiment provides a computer-readable storage medium for use with the computer system. This computer-readable storage medium may include a program module that, when executed by the computer system, causes the computer system to perform at least some of the aforementioned operations.

Another embodiment provides a method. This method includes at least some of the operations performed by the computer system.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
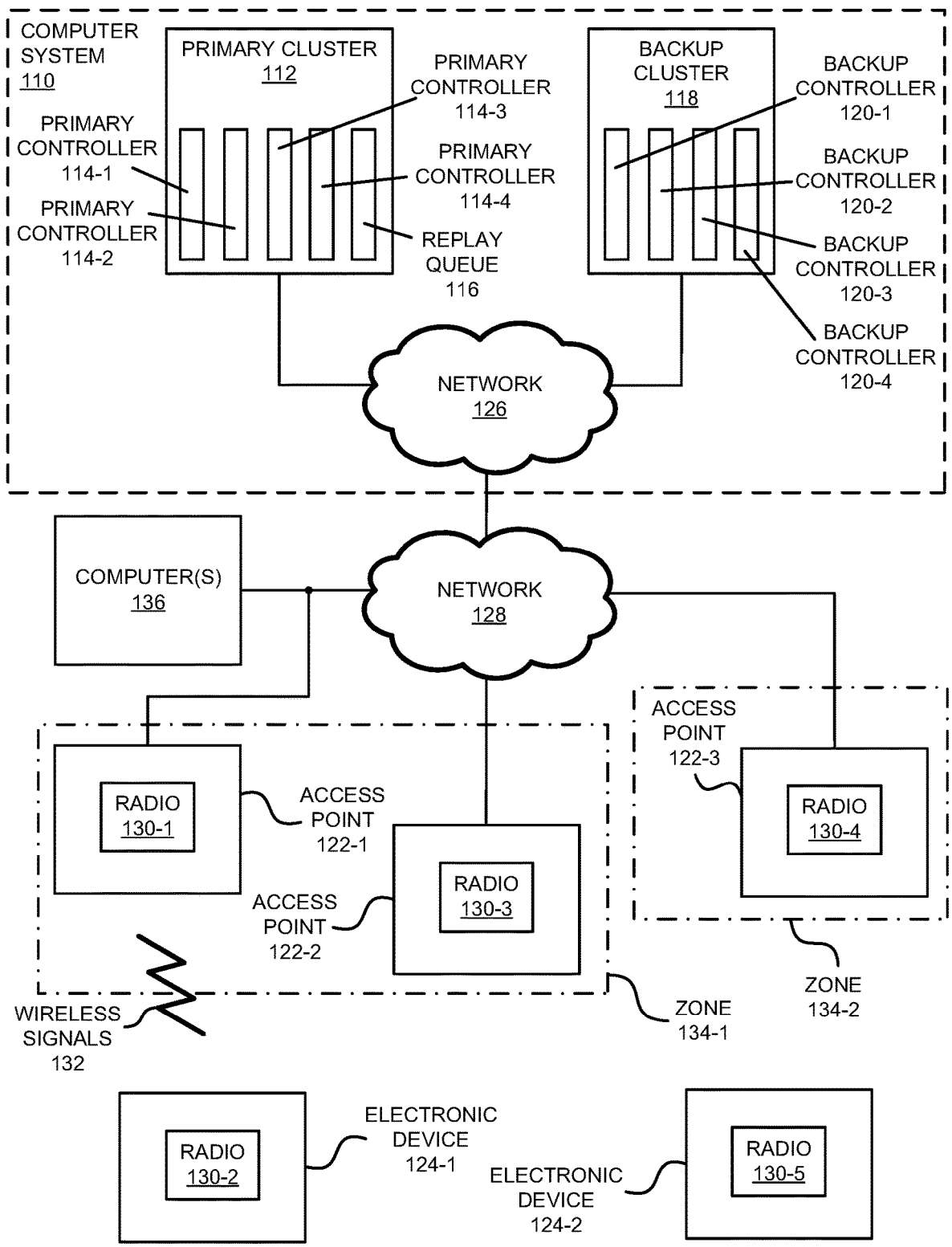
FIG. 1 is a block diagram illustrating a computer system in accordance with an embodiment of the present disclosure.

A synchronization technique is described. During the synchronization technique, states of a primary cluster in the computer system with multiple primary controllers that provide controllers for access points and a backup cluster in the computer system with multiple backup controllers that independently provide controllers for the access points may be dynamically synchronized. In particular the primary cluster may receive configuration requests with configuration information for the access points on an input node of the primary cluster. In response, the primary cluster may store the configuration requests in a replay queue in the computer system. Then, the primary cluster may playback the configuration requests in the replay queue for the backup cluster to synchronize the states of the primary cluster and the backup cluster. For example, the configuration requests may be played back within a time interval, such as a time interval may be associated with a service level agreement of a service provider of a service for the access points.

By synchronizing the states of the primary cluster and the backup cluster, this synchronization technique may provide reliable redundancy in the computer system. For example, if a primary controller in the primary cluster fails, the computer system can failover to another primary controller in the primary cluster or to a backup controller in the backup cluster that has the same state, thereby providing seamless failover coverage. Moreover, if a link between the primary cluster and the backup cluster fails, the primary cluster may continue to store additional configuration requests in the replay queue, and may playback these additional configuration requests for the backup controller when the link is available again. In these ways, the computer system may provide reliable service in a dynamic environment even when there are failures in the computer system. Consequently, the synchronization technique may remote reliable redundant support for the access points, which may improve customer satisfaction with the controllers provided by the computer system.

In the discussion that follows, electronic devices or components in the computer system communicate packets in accordance with a communication protocol. For example, the communication protocol may be compatible with an Institute of Electrical and Electronics Engineers (IEEE) 802.3 standard (which is sometimes referred to as "Ethernet"), such as an Ethernet II standard. However, a wide variety of communication protocols may be used, including wired and/or wireless communication. Therefore, in some embodiments the communication protocol may include or may be compatible with: an IEEE 802.11 standard (which is sometimes referred to as "Wi-Fi®", from the Wi-Fi Alliance of Austin, Tex.), Bluetooth® (from the Bluetooth Special Interest Group of Kirkland, Wash.), and/or another type of wireless interface (such as another wireless-local-area-network interface). In the discussion that follows, Ethernet and Wi-Fi are used as illustrative examples.

We now describe some embodiments of the synchronization technique. FIG. 1, presents a block diagram illustrating computer system 110, which may include components such as primary cluster 112 with primary controllers 114 (which are sometimes referred to as "nodes") and replay queue 116, and backup cluster 118 with backup controllers 120 (which are also sometimes referred to as "nodes"), access points 122 and electronic devices 124 (such as computers, portable electronic devices, e.g., cellular telephones, etc.) communicating according to some embodiments. In particular, communication within computer system 110 may occur via network 126 (such as the Internet or a dedicated link between primary cluster 112 and backup cluster 118, and communication with access points 122 may occur via network 128 (such as the Internet). In some embodiments, networks 126 and 128 are the same. However, in other embodiments they may be different. Note that access points 122 may provide access to network 128 (e.g., via an Ethernet protocol), and may be a physical access point or a virtual or "software" access point that is implemented on a computer or an electronic device. While not shown in FIG. 1, there may be additional components or electronic devices, such as a router.

Furthermore, as described further below, access points 122 and electronic devices 124 may communicate via wireless communication. In particular, one or more of electronic devices 124 and access points 122 may wirelessly communicate while: transmitting advertising frames on wireless channels, detecting one another by scanning wireless channels, exchanging subsequent data/management frames (such as association requests and responses) to establish a connection, configure security options (e.g., Internet Protocol Security), transmit and receive frames or packets via the connection (which may include the association requests and/or additional information as payloads), etc.

Figure 5:
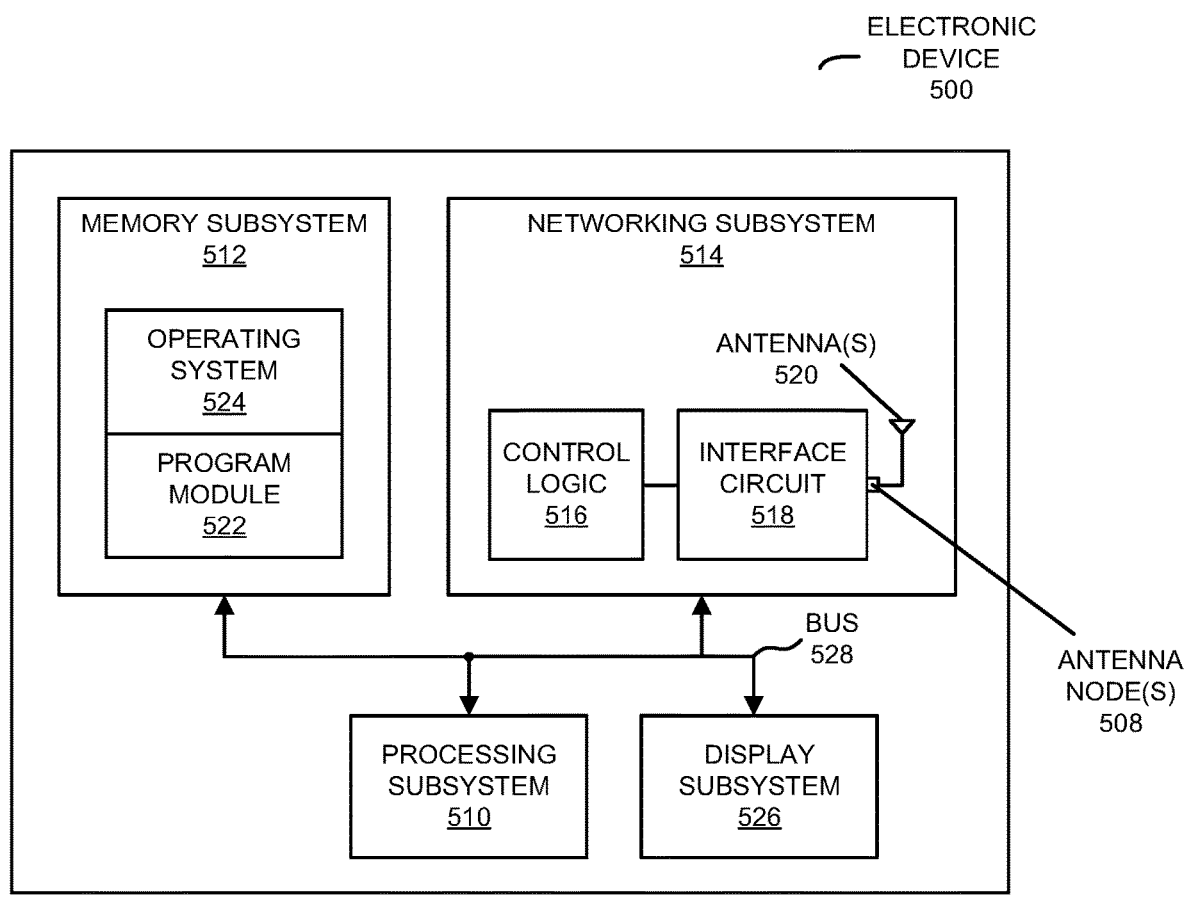
FIG. 5 is a block diagram illustrating an electronic device in accordance with an embodiment of the present disclosure.

As described further below with reference to FIG. 5, primary controllers 114, backup controllers 120, access points 122 and/or electronic devices 124 may include subsystems, such as a networking subsystem, a memory subsystem and a processor subsystem. In addition, access points 122 and electronic devices 124 may include radios 130 in the networking subsystems. More generally, access points 122 and electronic devices 124 can include (or can be included within) any electronic devices with the networking subsystems that enable access points 122 and electronic devices 124 to wirelessly communicate with each other.

As can be seen in FIG. 1, wireless signals 132 (represented by a jagged line) are transmitted from a radio 130-1 in access point 122-1. These wireless signals are received by radios 130 in at least one of electronic devices 124, such as electronic device 124-1. In particular, access point 122-1 may transmit frames or packets. In turn, these frames or packets may be received by electronic device 124-1. This may allow access point 122-1 to communicate information to electronic device 124-1. Note that the communication between access point 122-1 and a given one of electronic devices 124 (such as electronic device 124-1) may be characterized by a variety of performance metrics, such as: a data rate, a data rate for successful communication (which is sometimes referred to as a "throughput"), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the "capacity" of a communication channel or link), and/or a ratio of an actual data rate to an estimated data rate (which is sometimes referred to as "utilization"). While instances of radios 130 are shown in access points 122 and electronic devices 124, one or more of these instances may be different from the other instances of radios 130.

In order to use access points 122 (such as access point 122-1), they may need to be configured when it is first installed at a location (which is sometimes referred to as a "customer location", and which may different than a location (s) of computer system 110, i.e., the customer location may be a remote location from computer system 110), and/or they may be dynamically configured by customers on an ongoing basis. This configuration may include communication of configuration requests (that include configuration information) with at least one of primary controllers 114 in computer system 110 associated with the customer or zones 134 (which are sometimes referred to as a "failover zones") that includes subsets of access points 122. For example, the zones may be based on: geographic locations of access points 122 and/or software versions of access points 122 (such as firmware versions). In addition, computer system 110 may provide or facilitate additional services, such as location-based services, data archiving, analysis, reporting, etc. For example, primary controllers 114 and backup controllers 120 may include one or more: database computers or servers that store data for the customers, application computers or servers that execute customer applications, web servers that provide web pages, monitoring computers or servers that monitor or track activity by the users of access points 122 and/or electronic devices 124, etc.

In general, computer system 110 may provide services to multiple customers. In order to facilitate this, primary controllers 114 and backup controllers 120 are implemented using virtual machines, such as process virtual machines that execute versions of software in a platform-independent environment. Alternatively or additionally, the virtual machines may include system virtual machines (which are sometimes referred to as "full virtualization virtual machines") that emulate a physical machine including one or more operating systems, and that can provide multiple partitioned environments or containers that are isolated from one another, yet exist on the same physical machine (such as a computer or a server). Therefore, in the synchronization technique, primary controllers 114 and backup controllers 120 for the customers may be logically separated from each other.

As discussed previously, because service disruptions may be unacceptable, a given access point (such as access point 122-1) may be assigned a primary controller (such as primary controller 114-1) and an independent backup controller (such as backup controller 120-1). More generally, a subset of access points 122 in a given zone may be associated with or assigned to a given primary controller (such as primary controller 114-1) and a given backup controller (such as backup controller 120-1). For example, computer system 110 may provide one or more network addresses (such as an Internet Protocol or IP address) of the given primary controller and the given backup controller to the subset of access points 122 in the given zone.

In principle, this approach provides redundancy. However, it can be difficult to provide reliable redundant support for access points 122 because of the dynamic changes to the configurations of access points, and thus the dynamic changes in the states of primary controllers 114 and backup controllers 120. In particular, because of component in failures in computer system 110 and/or network 126, it can be difficult to ensure that primary controllers 114 and backup controllers 120 maintain the same state. Thus, it can be difficult to provide seamless redundant and reliable coverage for access points 122.

In order to address these challenges, computer system 110 may implement or use the synchronization technique. In particular, as discussed further below with reference to FIGS. 2 and 3, during the synchronization technique, primary cluster 112 (and, more generally, computer system 110) may receive configuration requests with configuration information for access points 122. For example, customers may provide the configuration information in a user interface or using an application programming interface provided by computer system 110, and which may be accessed using one or more computers 136 via network 128. In response, primary cluster 112 may store the configuration requests in replay queue 116. Moreover, primary cluster 112 may playback the configuration requests in replay queue 116 for backup cluster 118 to synchronize the states of primary cluster 112 and backup cluster 118. In some embodiments, the configuration requests are played back within a time interval. For example, the time interval may be associated with a service level agreement of a service provider of a service for at least some of access points 122.

In addition to maintaining the synchronization of the states of primary controllers 114 and backup controllers 120, the synchronization technique may provide seamless failover coverage. For example, if the given primary controller fails (such as primary controller 114-1), primary cluster 112 (and, more generally, computer 110) may receive requests associated with a subset of access points 122 in the given zone, e.g., primary cluster 112 may receive requests from access points 122-1 and 122-2 in zone 134-1. Then, primary cluster 112 (and, more generally, computer 110) may assign at least another primary controller (such as primary controller 114-2) to the subset of access points 122 in response to the requests. (Alternatively, the other primary controller may be pre-assigned to the subset of access points 122, e.g., computer system 110 may have previously provided the network address or IP address of the other primary controller to the subset of access points 122.) Moreover, primary controller 114-2 may provide failover coverage for the subset of access points 122 in response to the requests. Note that the requests may be independently received from the subset of access points 122. In some embodiments, primary cluster 112 (and, more generally, computer 110) may select the other primary controller based on loading of primary controllers 112.

Furthermore, if the other primary controller subsequently fails, backup cluster 118 (and, more generally, computer system 110) may receive additional requests associated with the subset of access points 122, e.g., backup cluster 118 may receive requests from access points 122-1 and 122-2 in zone 134-1. Then, backup controller 120-1 may provide failover coverage for the subset of access points 122 in response to the additional requests. Note that the additional requests may be independently received from the subset of access points 122.

Additionally, if a link between primary cluster 112 and backup cluster 118 fails (such as a failure in network 126), primary cluster 112 (and, more generally, computer system 110) may store additional configuration requests that are subsequently received (such as from one or more computers 136 via network 128) in replay queue 116. Then, primary cluster 112 (and, more generally, computer system 110) may playback the additional configuration requests in replay queue 116 for backup cluster 118 when the link is restored or is available again.

In these ways, the synchronization technique can provide seamless redundant and reliable coverage for access points 122, even when there are dynamic changes in the configurations of access points 122 (or in the states of primary cluster 112 and/or backup cluster 118) and/or if there are component in failures in computer system 110 and/or network 126. Thus, the synchronization technique may improve the performance of computer system 110, and this may improve customer experience and customer loyalty.

In the described embodiments, processing a frame or a packet in access points 122 and/or electronic devices 124 includes: receiving wireless signals 132 with the frame or packet; decoding/extracting the frame or packet from the received wireless signals 132 to acquire the frame or packet; and processing the frame or packet to determine information contained in the frame or packet.

Although we describe the network environment shown in FIG. 1 as an example, in alternative embodiments, different numbers or types of electronic devices or components may be present. For example, some embodiments comprise more or fewer electronic devices or components. Therefore, in some embodiments there may be fewer or additional instances of at least some of primary controllers 112 and/or backup controllers 120. As another example, in another embodiment, different electronic devices are transmitting and/or receiving frames or packets.

In some embodiments, primary cluster 112 and/or backup cluster 118 each have a designated "leader" node or controller (such as primary controller 114-1 or backup controller 120-1) that is the default controller to be used first until there is a failure in a given cluster. The designated leader node or controller may be defined within a cluster on a zone-by-zone basis. Alternatively or additionally, the designated leader node or controller may be dynamically assigned based on loading of a given cluster and/or loading of the nodes or controllers in a given cluster. Moreover, replay queue 116 may be included in or implemented in the designated leader control (such as in memory in or associated with primary controller 114-1).

Figure 2:
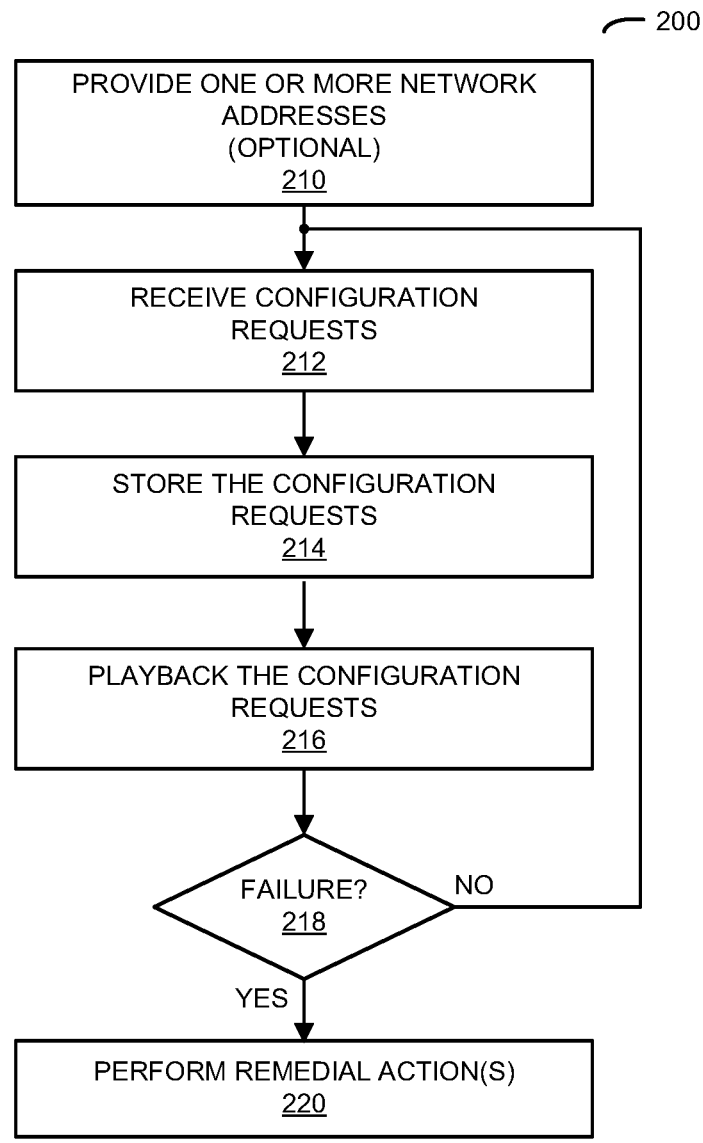
FIG. 2 is a flow diagram illustrating a method for synchronizing states of a primary cluster with multiple primary controllers and a backup cluster with multiple backup controllers in the computer system in FIG. 1 in accordance with an embodiment of the present disclosure.

We now describe embodiments of the method. FIG. 2 is a flow diagram illustrating a method 200 for synchronizing states of a primary cluster with multiple primary controllers and a backup cluster with multiple backup controllers according to some embodiments. Note that the primary controllers and the backup controllers independently implement controllers for access points. Moreover, method 200 may be performed by a computer system, such as by primary cluster 112 in computer system 110 in FIG. 1.

During operation, the primary cluster may receive configuration requests (operation 212) with configuration information for the access points on an input node of the primary cluster. Then, the primary cluster may store the configuration requests (operation 214) in the replay queue. Moreover, the primary cluster may playback the configuration requests (operation 216) in the replay queue for the backup cluster to synchronize the states of the primary cluster and the backup cluster. For example, the configuration requests may be played back within a time interval, such as a time interval associated with a service level agreement of a service provider of a service for the access points.

Note that the access points may be divided into zones and a given zone may be associated with a given primary controller and a given backup controller. For example, the zones may be based on: geographic locations of the access points, and/or software versions of the access points. In some embodiments, the computer system optionally provides one or more network addresses (operation 210) of the given primary controller and the given backup controller to an output node of the computer system for a subset of the access points in the given zone.

Moreover, in the event of a failure (operation 218), the computer system may perform a remedial action (operation 220). For example, if the given primary controller fails, the primary cluster may: receive requests associated with the subset of the access points in the given zone on the input node of the primary cluster; and provide, using at least another primary controller, failover coverage for the subset of the access points. Note that the requests may be independently received from the subset of the access points. In some embodiments, the primary cluster may select the other primary controller based on loading of the primary controllers.

Furthermore, if the other primary controller subsequently fails, the backup cluster may: receive additional requests associated with the subset of the access points on an input node of the backup cluster; and provide, using at least the given backup controller, failover coverage for the subset of the access points in response to the additional requests. Note that the additional requests may be independently received from the subset of the access points.

Additionally, when a link between the primary cluster and the backup cluster fails, the primary cluster may: store additional configuration requests that are subsequently received in the replay queue; and playback the additional configuration requests in the replay queue for the backup cluster when the link is restored.

In some embodiments of method 200, there may be additional or fewer operations. Moreover, the order of the operations may be changed, and/or two or more operations may be combined into a single operation.

Figure 3:
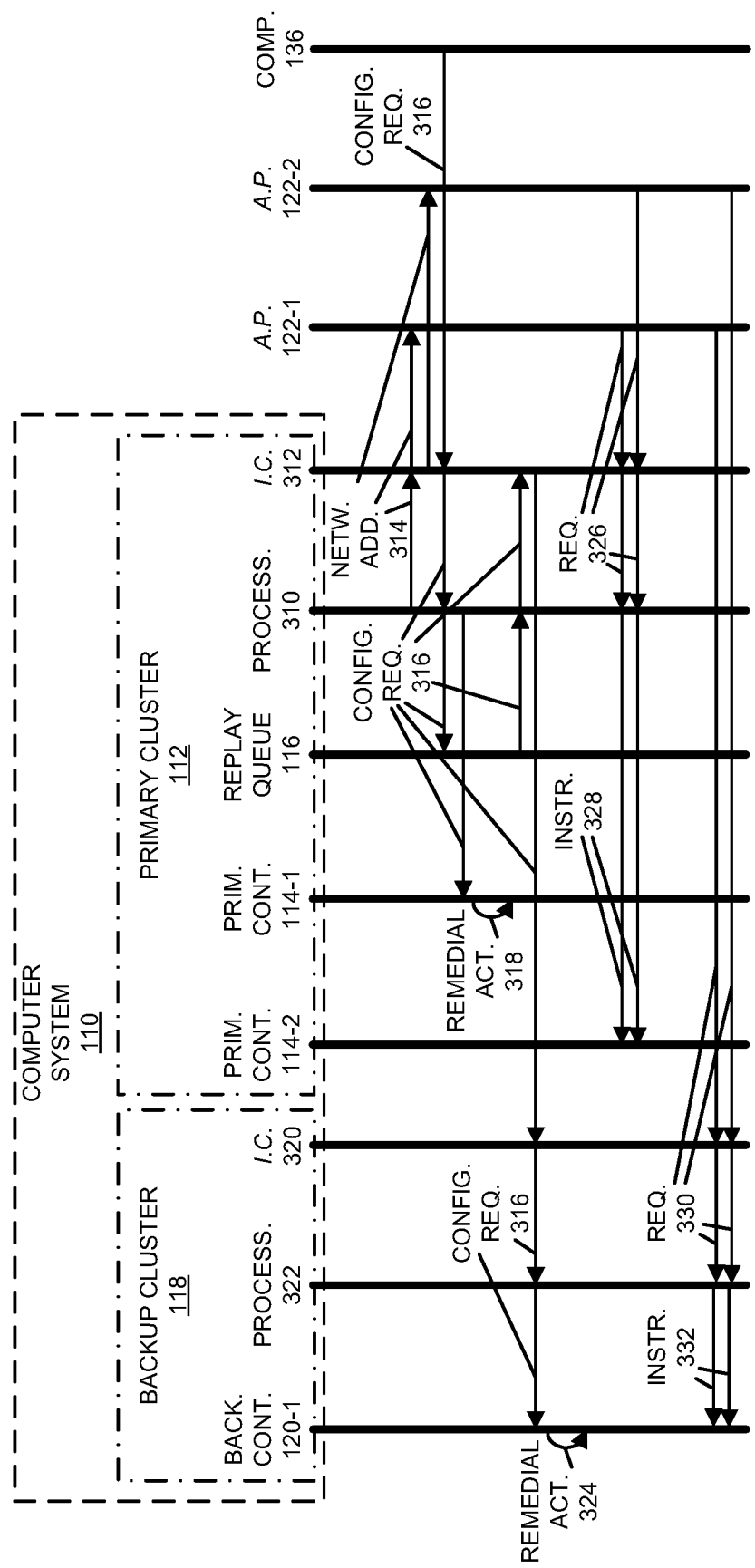
FIG. 3 is a drawing illustrating communication among electronic devices in FIG. 1 in accordance with an embodiment of the present disclosure.

Embodiments of the synchronization technique are further illustrated in FIG. 3, which presents a drawing illustrating communication among computer system 110, access point 122-1 and access point 122-2 in zone 134-1, and one or more computers 136 according to some embodiments. In particular, processor (process.) 310 in primary cluster 112 in computer system 110 may instruct interface circuit (I.C.) 312 to provide network addresses (netw. add.) 314 for primary controller 114-1, primary controller 114-2 and/or backup controller 120-1 to access points 122-1 and 122-2.

Subsequently, interface circuit 312 may receive configuration requests (config. req.) 316 from at least one of computers 136. For example, customers may use one or more of computers 136 to provide configuration information for access points 122-1 and/or 122-2. In some embodiments, the configuration information is provided by interacting with a user interface in a webpage that is displayed on one or more of computers 136.

After receiving configuration requests 316, interface circuit 312 may provide configuration requests 316 to processor 310, which stores them in replay queue 116. In addition, processor 310 may provide configuration requests 316 with the configuration information to primary controller 114-1, which may perform one or more remedial actions (remedial act.) 318 based on the configuration information in configuration requests 316. For example, primary controller 114-1 may provide, via interface circuit 312, the configuration information to access points 122-1 and/or 122-2.

Moreover, processor 310 may playback the configuration requests 316 in replay queue 116 for backup controller 120-1 in backup cluster 118 to synchronize the states of primary cluster 112 and backup cluster 118. For example, processor 310 may provide, via interface circuit 320 and processor 322 in backup cluster 118, the configuration information to backup controller 120-1, which may perform one or more remedial actions 324 based on the configuration information. In some embodiments, if a link between primary cluster 112 and backup cluster 118 fails, processor 118 may: store additional configuration requests that are subsequently received in replay queue 116; and playback the additional configuration requests in replay queue 116 for backup cluster 118 when the link is restored.

Furthermore, if primary controller 114-1 fails, access points 122-1 and 122-2 may provide requests 326 to interface circuit 312, which may forward requests 326 to processor 310. In response, processor 310 may instruct (instr.) 328 primary controller 114-2 to provide failover coverage for access points 122-1 and 122-2.

Additionally, if primary controller 114-2 subsequently fails, access points 122-1 and 122-2 may provide requests 330 to interface circuit 320, which may forward requests 330 to processor 322. In response, processor 322 may instruct 332 backup controller 120-1 to provide failover coverage for access points 122-1 and 122-2.

Note that the communication between components during the operations shown in FIG. 3 may be unidirectional or bidirectional.

Figure 4:
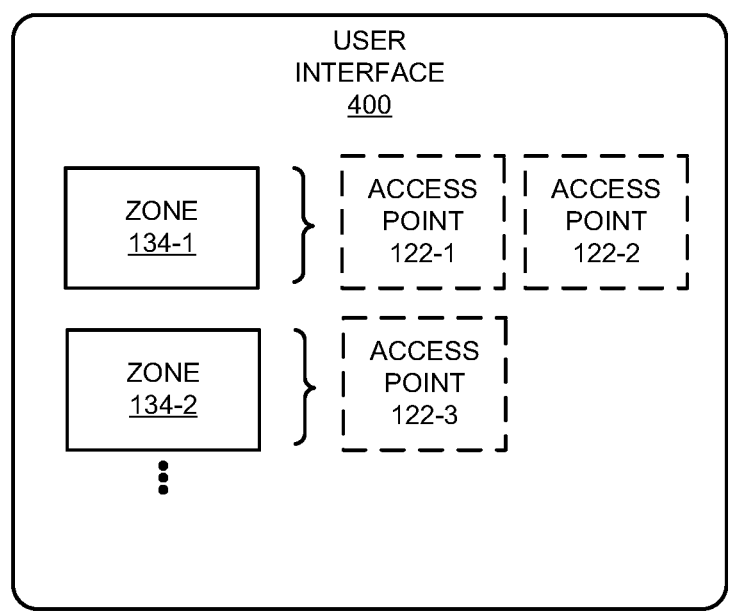
FIG. 4 is a block diagram illustrating a user interface in the computer system in FIG. 1 in accordance with an embodiment of the present disclosure.

We now further describe embodiments of the synchronization technique. FIG. 4 presents a block diagram illustrating a user interface 400 in a computer system, such as computer system 110, according to some embodiments. This user interface may indicate the assignments of access points 122 into zones 134. For example, access points 122 may be assigned to zones 134 based on their geographic locations (such as their country codes, states, cities, etc.), a version of their firmware and/or another characteristic of the access points or a feature associated with the access points. Note that a given zone may include, e.g., up to 1000 access points. Moreover, by defining zones 134 based on geographic location, the synchronization technique may ensure that the computer system provides geographic redundancy.

In some embodiments, the synchronization technique allows the computer system to support multiple node failures in a data center. For example, the computer system can sustain a double failure or a complete cluster failure without service interruption. In particular, the primary cluster and the backup cluster can each sustain one or more node failures. Moreover, the synchronization technique may ensure that: the access points are not aware or affected by cluster failover (thus, feature-level changes or development in the access points may not be needed to support the synchronization technique, so the feature-delivery velocity may not be impacted); transient network partitioning between the primary cluster and the backup cluster does not impact the computer-system uptime (even during a double node failure); and the primary cluster and the backup cluster can be active concurrently.

Note that configuration of the access points (and services provided to the access points by the computer system) may be performed via the primary cluster via a public application programming interface. The primary cluster may playback the configuration requests (in order) to the backup cluster. Moreover, failover zones may be marked or defined, and the IP addresses of the primary cluster and the backup cluster may be provided to the access points in the failover zones. For example, the priority order of the nodes in a given cluster may be based on the current node loading. Furthermore, the access points in the failover zones may independently failover to the backup cluster in the event of a failure in the computer system (such as in the primary cluster).

During the synchronization technique, the computer system may include two active clusters, such as the primary cluster and the backup cluster. An administrator of the computer system may mark or define some of the zones as failover zones. When an access point joins one of the failover zones, the computer system may provide the IP addresses of the primary cluster and the backup cluster to the access point. Then, if the access point detects a node failure in the primary cluster, it may try to join another node in the primary cluster. Moreover, when the access point detects that two nodes in the primary cluster are not reachable, it may join the backup cluster. (Thus, the first failover may be intracluster and a second failover may be intercluster.) The backup cluster may have an identical configuration for failover zone, so there will not be a service interruption.

This synchronization of the states of the primary cluster and the backup cluster may be facilitated using the replay queue. In particular, the configuration applied to the primary cluster may be backed up to backup cluster in a periodic fashion. As noted previously, the configuration applied to the primary cluster may occur via a pubic application programming interface (which may be externally accessed via a Web browser or a user interface). The primary cluster may build a replay queue of the configuration requests received via the application programming interface. After a time interval (such as every 15 minutes, and, more generally, a time interval that is based on a service level agreement that allows a limited downtime), the primary cluster may play the application-programming-interface configuration requests back to the backup cluster (thus, the configuration information may induce or result in the same byte pattern in the backup cluster even if it is encrypted). This may ensure that both the primary cluster and the backup cluster maintain or are in configuration synchronization. If there are errors during replay of the configuration requests, then the computer system may send an alarm or a notification. In response, the administrator may initiate a full manual backup of the entire configuration from the primary cluster followed by a restore operation on the backup cluster. Note that the use of redundant clusters with synchronized states may allow the access points to perform automated (i.e., without manual intervention) seamless (or graceful) and stateful switchover or failover from the primary cluster to the backup cluster.

Because the application-programming-interface configuration requests may be version controlled and pretested, there may not be additional testing burden for configuration on the nodes in the primary cluster or the backup cluster. Moreover, feature may not be required to take care of inter-cluster high-availability use cases. Furthermore, there may not be requirements to check the bi-directional link between the primary cluster and the backup cluster (i.e., the link does not always need to be operational). This is because the primary cluster can hold on to the replay queue for several hours, days or weeks until the link(s) is re-established. Therefore, temporary or transient network-partitioning issues between the primary cluster and the backup cluster (such as in the event of a link failure) may be avoided, because the access points can independently decide to failover to the backup cluster and may still receive an identical configuration from the backup cluster. Thus, only certain failover zones may failover, which may facilitate capacity planning while prioritizing some access points (such as those associated with higher paying customers, better service level agreements with smaller downtime limits, etc.).

In some embodiments, 2-8 nodes in the computer system form a cluster for a controller. In a given cluster, one of the nodes may be a designated node or a leader node.

We now describe embodiments of an electronic device, which may perform at least some of the operations in the synchronization technique. For example, the electronic device may include a component in computer system 110

(such as one of primary controllers 112 or one of backup controllers 120), one of access points 122 or one of electronic devices 124. FIG. 5 presents a block diagram illustrating an electronic device 500 in accordance with some embodiments. This electronic device includes processing subsystem 510, memory subsystem 512, and networking subsystem 514. Processing subsystem 510 includes one or more devices configured to perform computational operations. For example, processing subsystem 510 can include one or more microprocessors, ASICs, microcontrollers, programmable-logic devices, graphical processor units (GPUs) and/or one or more digital signal processors (DSPs).

Memory subsystem 512 includes one or more devices for storing data and/or instructions for processing subsystem 510 and networking subsystem 514. For example, memory subsystem 512 can include dynamic random access memory (DRAM), static random access memory (SRAM), and/or other types of memory (which collectively or individually are sometimes referred to as a "computer-readable storage medium"). In some embodiments, instructions for processing subsystem 510 in memory subsystem 512 include: one or more program modules or sets of instructions (such as program module 522 or operating system 524), which may be executed by processing subsystem 510. Note that the one or more computer programs may constitute a computer-program mechanism. Moreover, instructions in the various modules in memory subsystem 512 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 510.

In addition, memory subsystem 512 can include mechanisms for controlling access to the memory. In some embodiments, memory subsystem 512 includes a memory hierarchy that comprises one or more caches coupled to a memory in electronic device 500. In some of these embodiments, one or more of the caches is located in processing subsystem 510.

In some embodiments, memory subsystem 512 is coupled to one or more high-capacity mass-storage devices (not shown). For example, memory subsystem 512 can be coupled to a magnetic or optical drive, a solid-state drive, or another type of mass-storage device. In these embodiments, memory subsystem 512 can be used by electronic device 500 as fast-access storage for often-used data, while the mass-storage device is used to store less frequently used data.

Networking subsystem 514 includes one or more devices configured to couple to and communicate on a wired and/or wireless network (i.e., to perform network operations), including: control logic 516, an interface circuit 518 and one or more antennas 520 (or antenna elements). (While FIG. 5 includes one or more antennas 520, in some embodiments electronic device 500 includes one or more nodes, such as nodes 508, e.g., a pad, which can be coupled to the one or more antennas 520. Thus, electronic device 500 may or may not include the one or more antennas 520.) For example, networking subsystem 514 can include a Bluetooth networking system, a cellular networking system (e.g., a 3G/4G network such as UMTS, LTE, etc.), a universal serial bus (USB) networking system, a networking system based on the standards described in IEEE 802.11 (e.g., a Wi-Fi networking system), an Ethernet networking system, and/or another networking system.

In some embodiments, a transmit antenna radiation pattern of electronic device 500 may be adapted or changed using pattern shapers (such as reflectors) in one or more antennas 520 (or antenna elements), which can be independently and selectively electrically coupled to ground to steer the transmit antenna radiation pattern in different directions. Thus, if one or more antennas 520 includes N antenna-radiation-pattern shapers, the one or more antennas 520 may have $2^N$ different antenna-radiation-pattern configurations. More generally, a given antenna radiation pattern may include amplitudes and/or phases of signals that specify a direction of the main or primary lobe of the given antenna radiation pattern, as well as so-called "exclusion regions" or "exclusion zones" (which are sometimes referred to as "notches" or "nulls"). Note that an exclusion zone of the given antenna radiation pattern includes a low-intensity region of the given antenna radiation pattern. While the intensity is not necessarily zero in the exclusion zone, it may be below a threshold, such as 3 dB or lower than the peak gain of the given antenna radiation pattern. Thus, the given antenna radiation pattern may include a local maximum (e.g., a primary beam) that directs gain in the direction of an electronic device that is of interest, and one or more local minima that reduce gain in the direction of other electronic devices that are not of interest. In this way, the given antenna radiation pattern may be selected so that communication that is undesirable (such as with the other electronic devices) is avoided to reduce or eliminate adverse effects, such as interference or crosstalk.

Networking subsystem 514 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a "network interface" for the network system. Moreover, in some embodiments a "network" or a "connection" between the electronic devices does not yet exist. Therefore, electronic device 500 may use the mechanisms in networking subsystem 514 for performing simple wireless communication between the electronic devices, e.g., transmitting frames and/or scanning for frames transmitted by other electronic devices.

Within electronic device 500, processing subsystem 510, memory subsystem 512, and networking subsystem 514 are coupled together using bus 528. Bus 528 may include an electrical, optical, and/or electro-optical connection that the subsystems can use to communicate commands and data among one another. Although only one bus 528 is shown for clarity, different embodiments can include a different number or configuration of electrical, optical, and/or electro-optical connections among the subsystems.

In some embodiments, electronic device 500 includes a display subsystem 526 for displaying information on a display, which may include a display driver and the display, such as a liquid-crystal display, a multi-touch touchscreen, etc.

Electronic device 500 can be (or can be included in) any electronic device with at least one network interface. For example, electronic device 500 can be (or can be included in): a desktop computer, a laptop computer, a subnotebook/netbook, a server, a computer, a mainframe computer, a cloud-based computer, a tablet computer, a smartphone, a cellular telephone, a smartwatch, a consumer-electronic device, a portable computing device, an access point, a transceiver, a controller, a radio node, a router, a switch, communication equipment, an access point, test equipment, and/or another electronic device.

Although specific components are used to describe electronic device 500, in alternative embodiments, different components and/or subsystems may be present in electronic device 500. For example, electronic device 500 may include one or more additional processing subsystems, memory subsystems, networking subsystems, and/or display subsystems. Additionally, one or more of the subsystems may not be present in electronic device 500. Moreover, in some embodiments, electronic device 500 may include one or more additional subsystems that are not shown in FIG. 5. Also, although separate subsystems are shown in FIG. 5, in some embodiments some or all of a given subsystem or component can be integrated into one or more of the other subsystems or component(s) in electronic device 500. For example, in some embodiments program module 522 is included in operating system 524 and/or control logic 516 is included in interface circuit 518.

Moreover, the circuits and components in electronic device 500 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a "communication circuit" or a "means for communication") may implement some or all of the functionality of networking subsystem 514. The integrated circuit may include hardware and/or software mechanisms that are used for transmitting wireless signals from electronic device 500 and receiving signals at electronic device 500 from other electronic devices. Aside from the mechanisms herein described, radios are generally known in the art and hence are not described in detail. In general, networking subsystem 514 and/or the integrated circuit can include any number of radios. Note that the radios in multiple-radio embodiments function in a similar way to the described single-radio embodiments.

In some embodiments, networking subsystem 514 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that "monitoring" as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Wi-Fi and/or Ethernet communication protocols as illustrative examples, in other embodiments a wide variety of communication protocols and, more generally, communication techniques may be used. Thus, the synchronization technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the synchronization technique may be implemented using program module 522, operating system 524 (such as a driver for interface circuit 518) or in firmware in interface circuit 518. Alternatively or additionally, at least some of the operations in the synchronization technique may be implemented in a physical layer, such as hardware in interface circuit 518.

Moreover, while the preceding discussion illustrated the synchronization technique in the context of a cloud-based computer system that provides controllers for access points at remote locations, more generally the synchronization technique may be used in a computer system that provides services for electronic devices at remote locations. For example, a cluster-based solution that supports application programming interface-based configuration can use the synchronization technique to achieve inter-cluster failover.

In the preceding description, we refer to "some embodiments." Note that "some embodiments" describes a subset of all of the possible embodiments, but does not always specify the same subset of embodiments. Note that numerical values in the preceding embodiments are illustrative examples of some embodiments. In other embodiments of the synchronization technique, different numerical values may be used.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer system, comprising:
 a primary cluster with multiple primary controllers and a replay queue, wherein the primary cluster is configured to communicate with access points and a backup cluster; and the backup cluster with multiple backup controllers coupled to the primary cluster, wherein the backup cluster is configured to communicate with the access points and the primary cluster, wherein the primary controllers and the backup controllers are independently configured to implement controllers for the access points, and wherein the primary cluster is configured to:
receive configuration requests with configuration information for the access points on an input node of the primary cluster;
store the configuration requests in the replay queue; and
playback the configuration requests in the replay queue for the backup cluster to synchronize states of the primary cluster and the backup cluster, wherein the configuration requests are played back in order for the backup cluster.

2. The computer system of claim 1, wherein the access points are divided into zones and a given zone is associated with a given primary controller and a given backup controller.

3. The computer system of claim 2, wherein the zones are based on one or more of: geographic locations of the access points, and software versions of the access points.

4. The computer system of claim 2, wherein the computer system is configured to provide network addresses of the given primary controller and the given backup controller to an output node of the computer system for a subset of the access points in the given zone.

5. The computer system of claim 2, wherein, when the given primary controller fails, the primary cluster is configured to:
receive requests associated with a subset of the access points in the given zone on the input node of the primary cluster; and
in response to the requests, provide, using at least another primary controller, failover coverage for the subset of the access points.

6. The computer system of claim 5, wherein the requests are independently received from the subset of the access points.

7. The computer system of claim 5, wherein the primary cluster is configured to select the other primary controller based on loading of the primary controllers.

8. The computer system of claim 5, wherein, when the other primary controller subsequently fails, the backup cluster is configured to:
receive additional requests associated with the subset of the access points on an input node of the backup cluster; and
in response to the additional requests, provide, using at least the given backup controller, failover coverage for the subset of the access points.

9. The computer system of claim 8, wherein the additional requests are independently received from the subset of the access points.

10. The computer system of claim 1, wherein the configuration requests are played back within a time interval.

11. The computer system of claim 10, wherein the time interval is associated with a service level agreement of a service provider of a service for the access points.

12. The computer system of claim 1, wherein, when a link between the primary cluster and the backup cluster fails, the primary cluster is configured to:
store additional configuration requests that are subsequently received in the replay queue; and
playback the additional configuration requests in the replay queue for the backup cluster when the link is restored; and
wherein the additional configuration requests are played back in order for the backup cluster.

13. A non-transitory computer-readable storage medium for use in conjunction with a computer system that includes a primary cluster with multiple primary controllers and a backup cluster with multiple backup controllers, and the primary controllers and the backup controllers are independently configured to implement controllers for access points, the computer-readable storage medium storing program instructions that, when executed by the computer system, causes the computer system to perform one or more operations comprising:
receiving configuration requests for the primary cluster with configuration information for the access points;
storing the configuration requests in a replay queue; and
playing back the configuration requests in the replay queue for the backup cluster to synchronize states of the primary cluster and the backup cluster, wherein the configuration requests are played back in order for the backup cluster.

14. The computer-readable storage medium of claim 13, wherein the access points are divided into zones and a given zone is associated with a given primary controller and a given backup controller.

15. The computer-readable storage medium of claim 14, wherein, when the given primary controller fails, the one or more operations comprise:
receiving requests associated with a subset of the access points in the given zone; and
in response to the requests, providing, using at least another primary controller, failover coverage for the subset of the access points.

16. The computer-readable storage medium of claim 15, wherein, when the other primary controller subsequently fails, the one or more operations comprise:
receiving additional requests associated with the subset of the access points; and
in response to the additional requests, providing, using at least the given backup controller, failover coverage for the subset of the access points.

17. The computer-readable storage medium of claim 13, wherein, when a link between the primary cluster and the backup cluster fails, the one or more operations comprise:
storing additional configuration requests that are subsequently received in the replay queue; and
playing back the additional configuration requests in the replay queue for the backup cluster when the link is restored; and
wherein the additional configuration requests are played back in order for the backup cluster.

18. A method for synchronizing states of a primary cluster with multiple primary controllers and a backup cluster with multiple backup controllers, wherein the primary controllers and the backup controllers independently implement controllers for access points, comprising:
by a computer system:
receiving configuration requests for the primary cluster with configuration information for the access points;
storing the configuration requests in a replay queue; and
playing back the configuration requests in the replay queue for the backup cluster to synchronize states of the primary cluster and the backup cluster, wherein the configuration requests are played back in order for the backup cluster.

19. The method of claim 18, wherein the access points are divided into zones and a given zone is associated with a given primary controller and a given backup controller; and
wherein, when the given primary controller fails, the method comprises:
receiving requests associated with a subset of the access points in the given zone; and
in response to the requests, providing, using at least another primary controller, failover coverage for the subset of the access points.

20. The method of claim 19, wherein, when the other primary controller subsequently fails, the method comprises:
receiving additional requests associated with the subset of the access points; and
in response to the additional requests, providing, using at least the given backup controller, failover coverage for the subset of the access points.

* * * * *